US008559672B2

(12) United States Patent
Greig (10) Patent No.: US 8,559,672 B2
(45) Date of Patent: Oct. 15, 2013

(54) DETERMINING DETECTION CERTAINTY IN A CASCADE CLASSIFIER

(75) Inventor: Darryl Greig, Stoke Gifford (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/260,354

(22) PCT Filed: Jun. 1, 2009

(86) PCT No.: PCT/US2009/045793
§ 371 (c)(1),
(2), (4) Date: Sep. 25, 2011

(87) PCT Pub. No.: WO2010/141005
PCT Pub. Date: Dec. 9, 2010

(65) Prior Publication Data
US 2012/0243734 A1   Sep. 27, 2012

(51) Int. Cl.
*G06K 9/00* (2006.01)
(52) U.S. Cl.
USPC ................................ 382/103; 382/107
(58) Field of Classification Search
None
See application file for complete search history.

(56) References Cited

U.S. PATENT DOCUMENTS

| 7,020,337 | B2 | 3/2006 | Viola et al. | |
| 7,099,505 | B2 | 8/2006 | Li et al. | |
| 7,817,855 | B2 * | 10/2010 | Yuille et al. | 382/176 |
| 8,031,961 | B2 * | 10/2011 | Nachlieli et al. | 382/254 |
| 2005/0180627 | A1 * | 8/2005 | Yang et al. | 382/159 |
| 2007/0086660 | A1 * | 4/2007 | Ai et al. | 382/226 |
| 2007/0110322 | A1 * | 5/2007 | Yuille et al. | 382/227 |
| 2007/0286477 | A1 * | 12/2007 | Kim et al. | 382/159 |
| 2009/0018981 | A1 | 1/2009 | Zhang et al. | |
| 2009/0116693 | A1 * | 5/2009 | Yamamoto et al. | 382/103 |

OTHER PUBLICATIONS

Wu, et al., "Fast Rotation Invariant Multi-View Face Detection Based on Real Adaboost", IEEE Computer Society, Proceedings of the Sixth IEEE International Conference on Automatic Face and Gesture Recognition (FGR'04), 0-7695-2122-3/04 $ 20.00 © 2004 IEEE.

* cited by examiner

*Primary Examiner* — Nancy Bitar (57) ABSTRACT

Disclosed are embodiments for determining detection certainty in a cascade classifier (100). A first sequence (101) of detection stages (102) determines whether an image (112) is associated with a rare object. Each of the stages (102) rejects the image (112) when the image (112) is unassociated with the rare object and propagates the image (112) to a next stage (102) when the image (112) is unrejected. A second sequence (103) of detection stages (104) is configured for post-processing operation. If the image (112) is unrejected in a final stage (102*d*) of the first sequence (101), the second sequence (103) determines whether the image (112) is associated with the rare object. Each of the stages (104) propagates the image to a next stage (104), recording a rejection when the image (112) is unassociated with the rare object. A probability that the image (112) is associated with the rare object is determined.

15 Claims, 4 Drawing Sheets

DETERMINING DETECTION CERTAINTY IN A CASCADE CLASSIFIER

BACKGROUND

Cascade classifiers may be used to implement rare object detection in images. Such a cascade classifier comprises a plurality of detection stages that have been trained to detect whether a given image is part of or contains a type of rare object, such as a face. The cascade classifier comprises a plurality of detection stages, with each detection stage deciding whether to accept the image and propagate it to a subsequent stage or to reject the image and label it as a negative. If the image reaches the final detection stage and is accepted, the image is labeled as a positive.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The disclosure herein relates to determining detection certainty in a cascade classifier. Cascade classifiers may be trained for detecting one or more of a variety of rare objects in images. Rare objects are objects that typically are infrequently encountered in a set of images or a set of image patches comprising a larger image. Some examples of rare objects include, but are not limited to, faces, eyes and other portions of faces, people, automobiles, contraband, tumors and other medical image objects, and other objects. Some examples of images include, but are not limited to, digital photos, frames from digital video streams, scanned images, and other types of images and portions thereof.

Cascade classifiers are trained for rare object detection with a set of training images, which is a set of sample images that are known to be either associated with or unassociated with a type of rare object. Each detection stage of a cascade detector performs an analysis on a given image based on configurable parameters to determine whether the image contains, depicts a portion of, represents, or is otherwise associated with the rare object. The detection stage may employ, for example, linear discriminant analysis, support vector machines, and/or any other method used in performing classifications. The output of each stage is a stage response, which may be a single value or an array of values. A decision function is applied to the stage response to obtain a stage decision, that is, whether to accept the image as a positive match or to reject the image as a negative match. A non-limiting example of a decision function is a threshold. Thus, the decision function and/or the response of each stage may be configured based on whether the decision of the stage is correct for a set of training images.

Cascade classifiers used for rare object detection are usually optimized during training for a single point on the receiver operator characteristic (ROC) curve, that is, a particular rate of true positives with a particular rate of false positives. This point represents a tradeoff between the ability of the cascade classifier to minimize missed objects (i.e., false negatives) and incorrect detections (i.e., false positives). However, a trained cascade classifier may not be appropriate for a task that presupposes a different tradeoff point.

As a non-limiting example, an application implementing selective sharpening and smoothing of skin in images may benefit from the cascade classifier detecting as many faces as possible. Such an application may be fairly robust to false positives because the eye may find it difficult to detect smoothing or sharpening in an area not containing a face. By contrast, as a non-limiting example, an application implementing skin tone correction may need as few false positives as possible because a false positive will result in an unacceptable skewing of the tone curve, while missing a face (i.e., a false negative) merely leaves the image unchanged.

Considerable system resources may be necessary to operate cascade classifiers, so the possibility of running a cascade classifier multiple times at different tradeoff points may be unacceptable. Embodiments of the present disclosure include a modified cascade classifier that may be run once to produce a probability value for a high proportion of images associated with the sought rare object. There may be a probability value produced for any number of false positives, but the embodiments may be configured so that the probability values for true positives is significantly higher than that for false positives. In such embodiments, the results may be subjected to a threshold configured for different tradeoff requirements associated with different applications.

Figure 1:
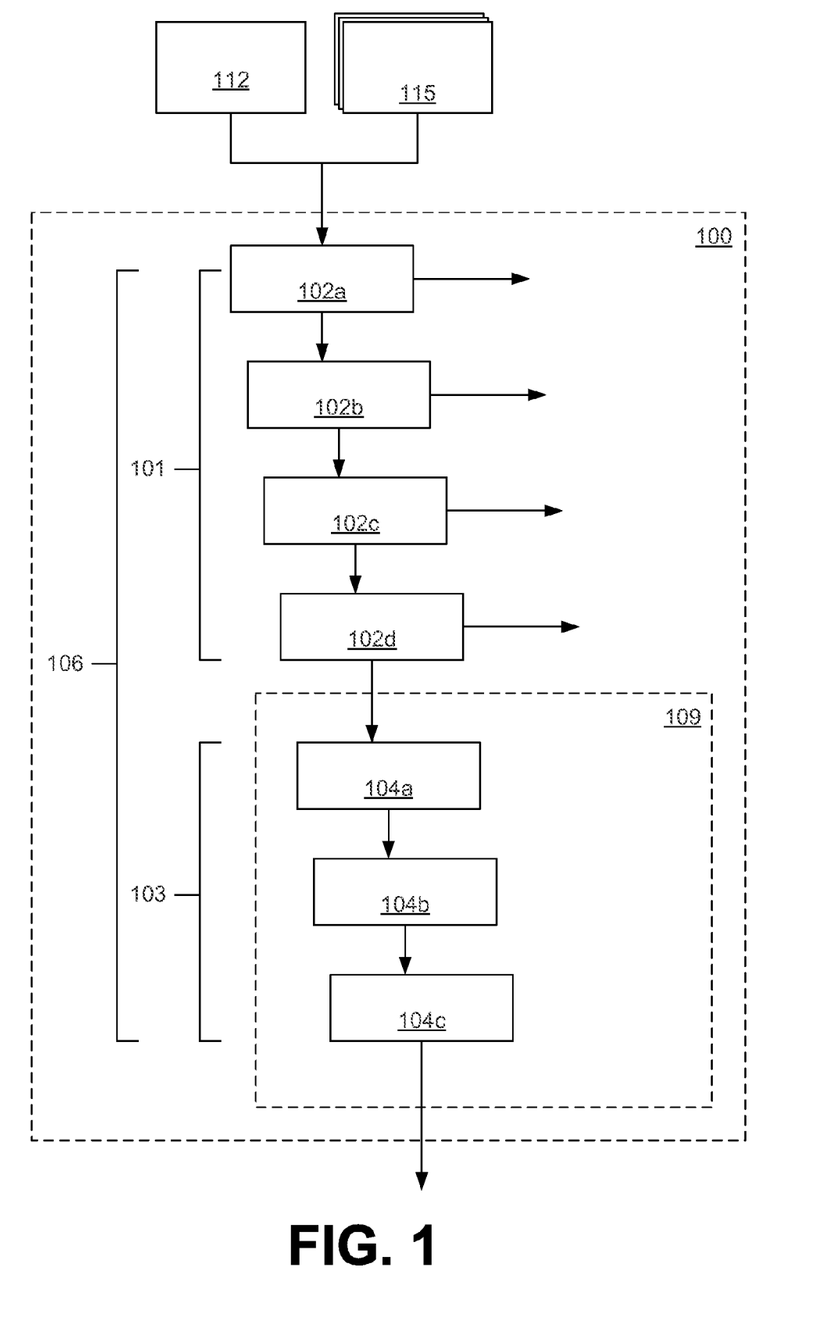
FIG. 1 is a schematic block diagram that provides one example illustration of a cascade classifier according to one embodiment of the present disclosure.

With reference to FIG. 1, shown is a cascade classifier 100 according to one embodiment of the present disclosure. The cascade classifier 100 implements rare object detection for an image and determines detection certainty by determining a probability value that the image is associated with the rare object. The cascade classifier 100 comprises a first sequence 101 of one or more detection stages 102 and a second sequence 103 of two or more detection stages 104. In some embodiments, the first sequence 101 of one or more detection stages 102 and the second sequence 103 of two or more detection stages 104 may be together regarded as a combined sequence 106 of detection stages 102, 104. In various embodiments, cascade classifier 100 represents a reconfiguration or modification of a trained cascade classifier comprising the combined sequence 106 of detection stages 102, 104.

The first sequence 101 of one or more detection stages 102 comprises a plurality of detection stages 102. FIG. 1 depicts four detection stages 102a-102d in the first sequence 101 of one or more detection stages 102. In other embodiments, the first sequence 101 of one or more detection stages 102 may comprise some other number of detection stages 102, such as, for example, twenty detection stages 102.

Likewise, the second sequence 103 of two or more detection stages 104 comprises a plurality of detection stages 104. FIG. 1 depicts three detection stages 104a-104c in the first sequence of one or more detection stages 103. In other embodiments, the first sequence of one or more detection stages 103 may comprise some other number of detection stages 104, such as, for example, ten detection stages 104. In some embodiments, the second sequence 103 of two or more detection stages 104 may be regarded as a post-processing stage 109 for the cascade classifier 100.

The first sequence 101 of one or more detection stages 102 operates similarly to the detection stages of an ordinary cascade classifier. An image patch 112 is provided as input to detection stage 102a. The image patch 112 may represent an image or a portion of a larger image. In one embodiment, the image patch 112 is a nineteen pixel by nineteen pixel portion of an image. The detection stage 102a determines whether the image patch 112 is associated with the rare object according to one or more types of image features. As a non-limiting example, the detection stage 102a may examine the differences in intensities of the image patch 112 and/or the variance in pink tones to determine if the image patch 112 is associated with a face.

If the image patch 112 is determined to be unassociated with the rare object, the detection stage 102a is configured to reject the image patch 112. In some embodiments, the detection stage 102a may mark or label the image patch 112 as a negative. Otherwise, if the image patch 112 is determined to be associated or possibly associated with the rare object, the detection stage 102a then propagates the image patch 112 to the next detection stage 102, detection stage 102b. The stage response of each detection stage 102 may be recorded upon processing the image patch 112 in some embodiments.

At the final detection stage 102d, if the image patch 112 is determined to be associated or possibly associated with the rare object, the image patch 112 is propagated to the first detection stage 104 of the second sequence 103 of two or more detection stages 104. The final detection stage 102d may be referred to as a truncation detection stage because the ordinary detection stage operation is configured to cease at the final detection stage 102d.

The second sequence 103 of two or more detection stages 104 operate differently from detection stages of an ordinary cascade classifier. Rather than ending processing of an image patch 112 when it is determined to be unassociated with a rare object and rejected, each detection stage 104 may be configured to propagate every image patch 112 to the next detection stage 104. The result of the determination, the detection stage decision, that is, whether the image patch 112 is determined by the detection stage 104 to be positive or negative, may be recorded. Therefore, if the image patch 112 is determined to be unassociated with the rare object, instead of the image patch 112 being rejected outright, a rejection of image patch 112 may be recorded. Additionally, the detection stage response for each detection stage 104 may be recorded.

Under normal operation of a cascade classifier, the image patches 112 being unrejected after a last detection stage may be marked or labeled as positive matches. With the actual rejections being stopped after the final detection stage 102d, the cascade classifier 100 operates differently from a normally operating cascade classifier when post-processing operation is enabled. The post-processing stage 109 determines a probability value that the image patch 112 is associated with the rare object. As a non-limiting example, this probability value may be based at least in part on stage decisions and stage responses recorded for some or all detection stages 102 and/or 104 and potentially other parameters.

In various embodiments, the post-processing stage 109 may reject the image patch 112 outright when the number of rejections recorded by detection stages 104 of the second sequence 103 meets a threshold. In such cases, the post-processing stage 109 may set the probability value for the image patch 112 to zero.

The post-processing stage 109 may use one or more empirical distributions to compute the probability value for the image patch 112. The empirical distributions may be associated with a plurality of image patches 112 from a set of training images 115 that are known either to be associated or unassociated with the rare object and, for the purposes of the empirical distributions, which are unrejected after the final detection stage 102d. The empirical distributions may, for example, model a sum of detection stage responses from the second sequence 103 of two or more detection stages 104 for the training images 115 that are unrejected, and/or the number of rejections recorded by the second sequence 103 of two or more detection stages 104 for the training images 115 that are unrejected. In one embodiment, the empirical distributions may also be based on the stage responses recorded by the first sequence 101 of one or more detection stages 102 associated with the training images 115 that were propagated to the second sequence 103 of two or more detection stages 104. The empirical distributions may employ Gaussian distributions, binomial distributions, and/or other distributions. In one embodiment, the sum of detection stage responses may be modeled by a Gaussian distribution, and the number of rejections recorded may be modeled by a binomial distribution.

In some embodiments, the post-processing stage 109 may employ a more general statistical model, such as, for example, linear discriminant analysis, logistic regression, support vector machine (SVM), etc., to determine a probability value rather than a hard classification. In such embodiments, the image features for the post-processing stage 109 may be drawn, for example, from the pool of image features in the detection stages 104, or the pool of image features in all detection stages 102, 104 of an existing cascade classifier 100. In one embodiment, each detection stage 104 in the second sequence 103 of two or more detection stages 104 is configured to generate from a statistical model a separate probability value that the image patch 112 is associated with the rare object.

Figure 2:
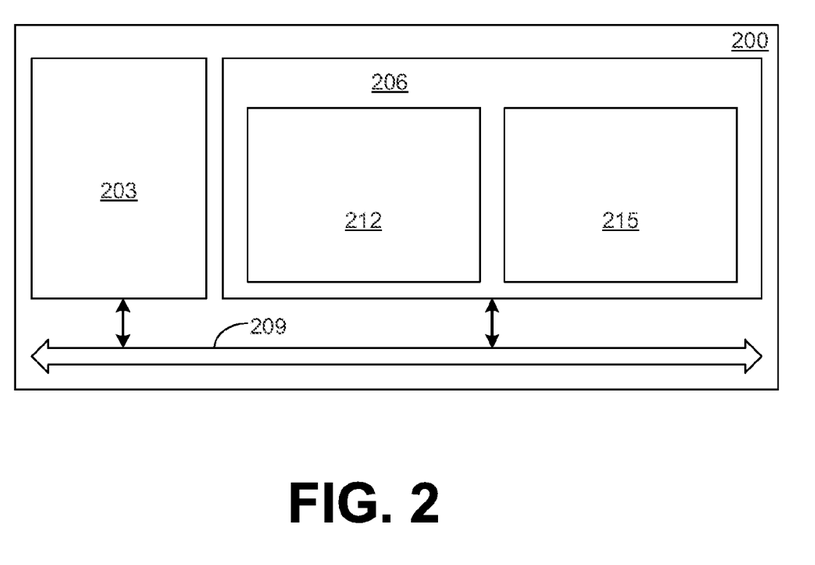
FIG. 2 is a schematic block diagram that provides one example illustration of a computer system implementing a cascade classifier application and a cascade classifier training application according to various embodiments of the present disclosure.

Referring next to FIG. 2, shown is an example of one embodiment of a computer system 200 according to various embodiments. The computer system 200 may include a processor circuit having a processor 203 and a memory 206, both of which are coupled to a local interface 209. The local interface 209 may comprise, for example, a data bus with an accompanying control/address bus. Various components may be stored in the memory 206 and are executable by the processor 203 including, for example, a cascade classifier application 212 and a cascade classifier training application 215. In addition, other applications may be stored in the memory 206 and executable by the processor 203, such as, for example, an operating system.

The cascade classifier application 212 implements a cascade classifier 100 (FIG. 1). The cascade classifier application 212 may also implement an unmodified cascade classifier 100 comprising a combined sequence 106 of detection stages 102, 104 (FIG. 1), including the first sequence 101 of one or more detection stages 102 (FIG. 1) and the second sequence 103 of two or more detection stages 104 (FIG. 1). In such an unmodified cascade classifier 100, the second sequence 103 of two or more detection stages 104 functions similarly to the first sequence 101 of one or more detection stages 102, which continues under normal operation. The cascade classifier application 212 may be configurable to switch between unmodified and modified operation for the cascade classifier 100.

In unmodified operation, the output of the cascade classifier application 212 comprises a binary determination, whether a given image patch 112 (FIG. 1) is associated or unassociated with a given rare object. By contrast, in modified operation with post-processing operation enabled for the second sequence 103, the output of the cascade classifier application 212 may comprise a probability value that the given image patch 112 is associated with the given rare object. The probabilistic determination enables applications with different tradeoff requirements to use the same result.

The cascade classifier training application 215 may be used to train the cascade classifier 100 of the cascade classifier application 212 for detecting a given rare object or to retrain the cascade classifier 100 for modified operation. In some embodiments, the cascade classifier training application 215 may be implemented as a portion of the cascade classifier application 212. To train the cascade classifier 100 initially for detecting a rare object, the cascade classifier training application 215 trains each detection stage 102, 104 (FIG. 1) using a set of training images 115 (FIG. 1). The set of training images 115 comprises a set of images known to be associated with the rare object and a set of images known to be unassociated with the rare object. As a non-limiting example, if the detection stages 102, 104 are to be trained to detect faces, the set of training images 115 will include a number of images known to include faces and a number of images known not to include faces. Accordingly, parameters controlling the response of detection stages 102, 104 may be configured by the cascade classifier training application 215 based on how the detection stages 102, 104 respond to the set of training images 115.

The cascade classifier training application 215 may implement a retraining procedure in order to modify the operation of cascade classifier 100 by configuring the post-processing stage 109 (FIG. 1) for post-processing operation. The retraining includes dividing a combined sequence 106 of detection stages 102, 104 into the first sequence 101 of one or more detection stages 102 and the second sequence 103 of two or more detection stages 104. To perform this division, a truncation detection stage (e.g., the final detection stage 102d (FIG. 1)) may be determined. The determination of a truncation detection stage is important because if it is set too early in the combined sequence 106 of detection stages 102, 104, the cascade classifier 100 may be inefficient and the second sequence 103 of two or more detection stages 104 may run on too many image patches 112. If the truncation detection stage is set too late in the combined sequence 106 of detection stages 102, 104, too many true positives may be rejected and there may be little difference between the modified cascade classifier 100 and an ordinary, unmodified cascade classifier 100.

In one embodiment, the truncation detection stage is set to be the detection stage 102 at which a number of images unrejected from the set of images known to be unassociated with the rare object is substantially equal to the cardinality of the set of images known to be associated with the rare object. This may be implemented, for example, by determining whether each one of a set of training images 115 is rejected by each detection stage 102, 104 of the combined sequence 106 of detection stages 102, 104 of the cascade classifier 100. In such a case, the classification problem is no longer rare event detection and is more like traditional two-class classification.

Additionally, once the truncation detection stage is determined, the cascade classifier training application 215 may determine empirical distributions for the set of training images 115 for the detection stages 104 in the second sequence 103 of two or more detection stages 104. Such empirical distributions may model, for example, the sum of all the detection stage 104 stage responses, the number of detection stages 104 that would have rejected a given image patch 112, and other sample statistics.

In some embodiments, the retraining process of the cascade classifier training application 215 may require only two passes of the trained cascade over a reasonably sized set of training images 115, which may be considerably less than the training requirement for a single detection stage 102, 104 of the unmodified cascade classifier 100. A reasonably sized set of training images 115 may comprise, as a non-limiting example, between 4,000 and 10,000 training images 115 for each of the sets of training images 115 comprising images that are associated with the rare object and images that are unassociated with the rare object. By contrast, the training requirement for a single detection stage 102, 104 of the unmodified cascade classifier 100 may be approximately the number of features associated with that detection stage 102, 104, which may range, for example, from 100 to 500 features in later detection stages 102, 104.

The cascade classifier application 212 and the cascade classifier training application 215 are described as stored in the memory 206 and executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, or source code that may be expressed in proper format such as object code that is capable of being loaded into a of random access portion of the memory 206 and executed by the processor 203, etc. An executable program may be stored in any portion or component of the memory 206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206 is defined herein as both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 203 may represent multiple processors and the memory 206 may represent multiple memories that operate in parallel. In such a case, the local interface 209 may be an appropriate network that facilitates communication between any two of the multiple processors 203, between any processor 203 and any one of the memories 206, or between any two of the memories 206, etc. Thus, computer system 200 may comprise multiple physical computer systems.

Figure 3:
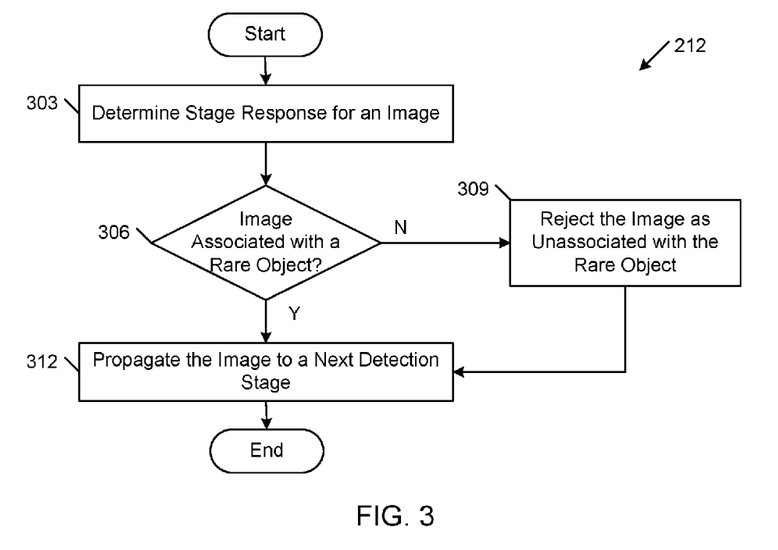
FIGS. 3-5 are flowcharts that provide three examples of various functionality performed by the cascade classifier application of FIG. 2 according to various embodiments of the present disclosure.

Referring next to FIG. 3, shown is a flowchart that provides one example of the operation of a portion of the cascade classifier application 212 (FIG. 2) according to various embodiments of the present disclosure. Alternatively, the flowchart of FIG. 3 may be viewed as depicting steps of an example method implemented in the computer system 200 (FIG. 2) to perform the functionality of a detection stage 102 (FIG. 1).

Beginning with box 303, the cascade classifier application 212, in a particular detection stage 102, determines the stage response for an image patch 112 (FIG. 1). This may include, for example, examining the intensities, color balance, and other characteristics of the image patch 112. Next, in box 306, the cascade classifier application 212 determines whether the image patch 112 is associated with a rare object. This determination may be performed by comparing the stage response with stored parameters computed when the detection stage 102 was trained for detecting the rare object.

If, in box 306, the cascade classifier application 212 determines that the image patch 112 is unassociated with the rare object, in box 309, then the cascade classifier application 212 rejects the image patch 112 as unassociated with the rare object. Having rejected the image patch 112, the cascade classifier application 212 ends. If, in box 306, the cascade classifier application 212 instead determines that the image patch 112 is associated with the rare object, in box 312, then the cascade classifier application 212 propagates the image patch 112 to a next detection stage 102. Alternatively, in box 312, if the detection stage 102 is the last in the first sequence 101 of one or more detection stages 102, the cascade classifier application 212 propagates the image patch 112 to a next detection stage 104. The cascade classifier application 212 then ends processing of the image patch 112 for the detection stage 102.

Figure 4:
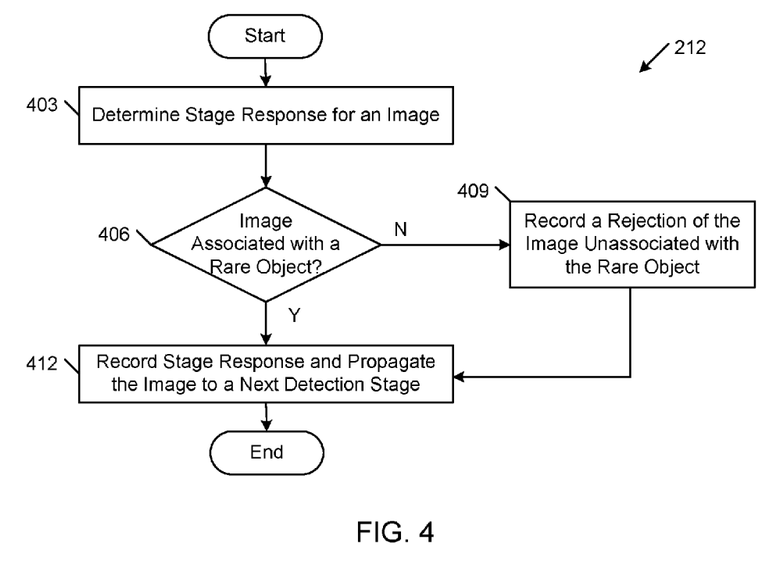

Turning now to FIG. 4, shown is a flowchart that provides one example of the operation of a portion of the cascade classifier application 212 (FIG. 2) according to various embodiments of the present disclosure. Alternatively, the flowchart of FIG. 4 may be viewed as depicting steps of an example method implemented in the computer system 200 (FIG. 2) to perform the functionality of a detection stage 104 (FIG. 1) configured under post-processing operation.

Beginning with box 403, the cascade classifier application 212, in a particular detection stage 104, determines the stage response for an image patch 112 (FIG. 1). This may include, for example, examining the intensities, color balance, and other characteristics of the image patch 112. Next, in box 406, the cascade classifier application 212 determines whether the image patch 112 is associated with a rare object. This determination may be performed by applying a decision function to a stage response, for example, by comparing the stage response with stored parameters computed when the detection stage 104 was trained for detecting the rare object.

If, in box 406, the cascade classifier application 212 determines that the image patch 112 is unassociated with the rare object, in box 409, then the cascade classifier application 212 records a rejection of the image patch 112 as unassociated with the rare object. The cascade classifier application 212 next moves to box 412. If, in box 406, the cascade classifier application 212 instead determines that the image patch 112 is associated with the rare object, then the cascade classifier application 212 moves to box 412 also. In box 412, the cascade classifier application 212 propagates the image patch 112 to a next detection stage 104 and may record the stage response. Alternatively, if the detection stage 104 is the last in the second sequence 103 of two or more detection stages 104, then the cascade classifier application 212 determines a probability value that the image patch 112 is associated with the rare object. The cascade classifier application 212 then ends processing of the image patch 112 for the detection stage 104.

Figure 5:
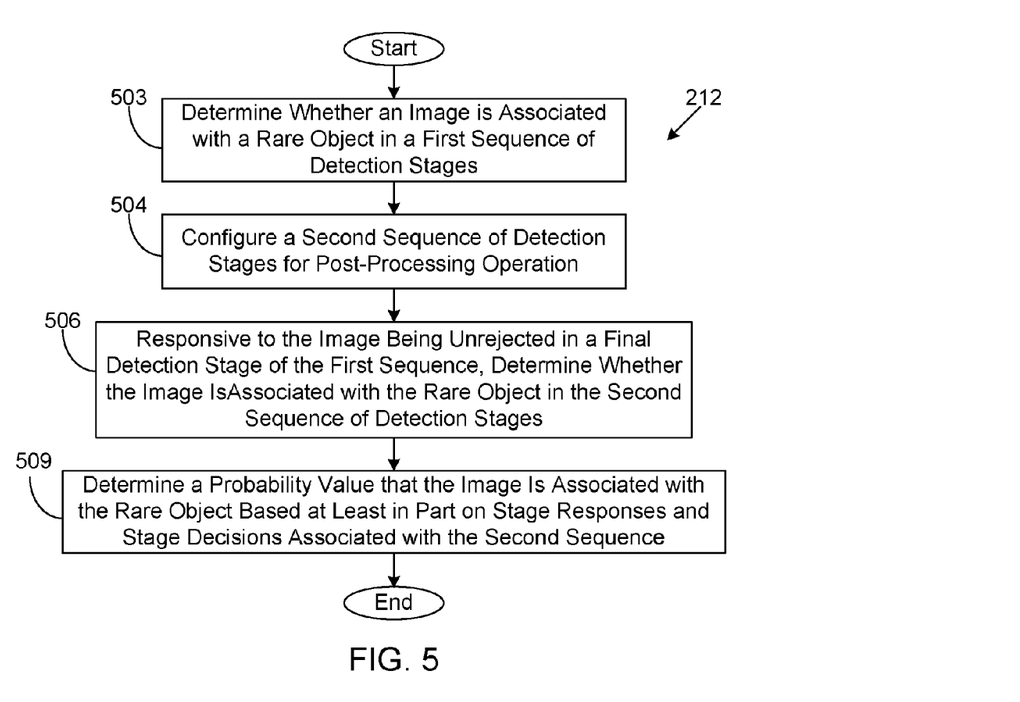

Moving now to FIG. 5, shown is a flowchart that provides one example of the operation of the cascade classifier application 212 (FIG. 2) according to various embodiments of the present disclosure. Alternatively, the flowchart of FIG. 5 may be viewed as depicting steps of an example method implemented in the computer system 200 (FIG. 2) to perform the functionality of a cascade classifier 100 (FIG. 1).

Beginning with box 503, the cascade classifier application 212 determines whether an image patch 112 (FIG. 1) is associated with a rare object in a first sequence 101 of one or more detection stages 102 (FIG. 1). The determination may involve application of the functionality depicted in the flowchart of FIG. 3 repeated for one or more detection stages 102 (FIG. 1) of the first sequence 101 of one or more detection stages 102. In box 504, the cascade classifier application 212 configures the second sequence 103 of two or more detection stages 104 for post-processing operation, the second sequence 103 of two or more detection stages 104 being configurable for normal or post-processing operation.

Next, in box 506, responsive to the image patch 112 being unrejected in a final detection stage 102 of the first sequence 101 of one or more detection stages 102, the cascade classifier application 212 determines whether the image patch 112 is associated with the rare object in the second sequence 103 of two or more detection stages 104. The determination may involve application of the functionality depicted in the flowchart of FIG. 4 repeated for every detection stage 104 (FIG. 1) in the second sequence 103 of two or more detection stages 104. In box 509, the cascade classifier application 212 determines a probability value that the image patch 112 is associated with the rare object based at least in part on stage responses and stage decisions associated with the second sequence 103 of two or more detection stages 104. The probability value may also be based in part on feature responses, stage responses, and/or stage decisions from any of the detection stages 102, 104. The cascade classifier application 212 then ends.

Figure 6:
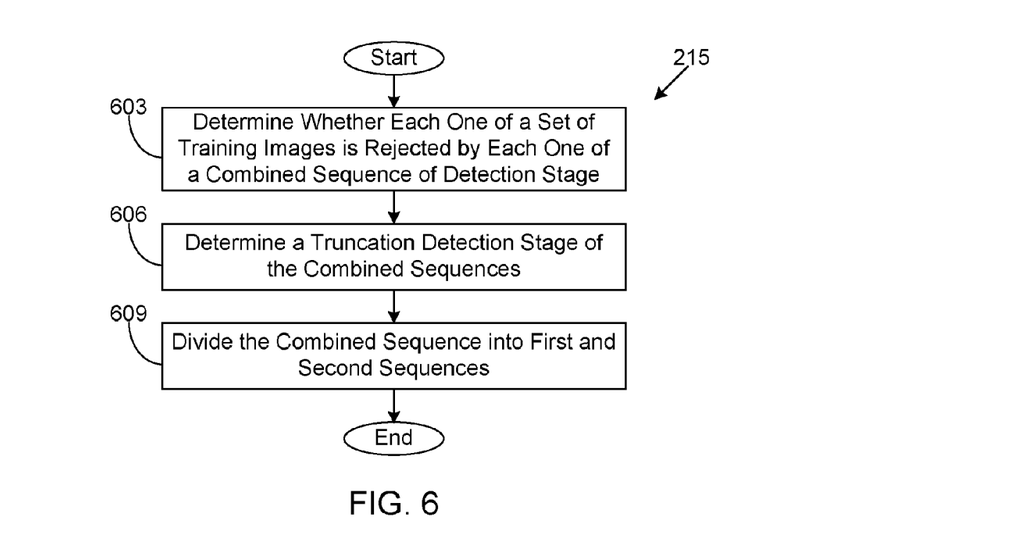
FIG. 6 is a flowchart that provides one example of various functionality performed by the cascade classifier training application of FIG. 2 according to various embodiments of the present disclosure.

With reference to FIG. 6, shown is a flowchart that provides one example of the operation of a portion of the cascade classifier training application 215 (FIG. 2) according to various embodiments of the present disclosure. Alternatively, the flowchart of FIG. 6 may be viewed as depicting steps of an example method implemented in the computer system 200 (FIG. 2) to perform the functionality of the cascade classifier training application 215. In some embodiments, the functionality of the cascade classifier training application 215 may be implemented as a portion of the cascade classifier application 212 (FIG. 2).

Beginning in box 603, the cascade classifier training application 215 determines whether each one of a set of training images 115 (FIG. 1) is rejected by each one of a combined sequence 106 of detection stages 102, 104 (FIG. 1) of the cascade classifier 100 (FIG. 1). The set of training images 115 comprises a set of training images 115 known to be associated with the rare object and a set of training images 115 known to be unassociated with the rare object. Next, in box 606, the cascade classifier training application 215 determines a truncation detection stage 102 (FIG. 1) of the combined sequence 106 of detection stages 102, 104. In one embodiment, the number of training images unrejected at the truncation detection stage 102 from the set of training images 115 known to be unassociated with the rare object is substantially equal to the cardinality of the set of training images 115 known to be associated with the rare object. In box 609, once the truncation detection stage 102 is determined, the cascade classifier training application 215 may divide the combined sequence 106 of detection stages 102, 104 into a first sequence 101 of one or more detection stages 102 (FIG. 1) and a second sequence 103 of two or more detection stages 104 (FIG. 1). The final detection stage 102 of the first sequence 101 of one or more detection stages 102 is the truncation detection stage 102. The cascade classifier training application 215 then ends.

The functionality of the cascade classifier application 212 and the cascade classifier training application 215 as depicted by the example flowcharts of FIGS. 3-6 may be implemented, for example, in an object oriented design or in some other programming architecture. Assuming the functionality is implemented in an object oriented design, then each block represents functionality that may be implemented in one or more methods that are encapsulated in one or more objects. The cascade classifier application 212 and the cascade classifier training application 215 may be implemented using any one of or a combination of a number of programming languages such as, for example, C, C++, C#, Visual Basic, VBScript, Java, JavaScript, Perl, Ruby, Python, Flash, or other programming languages.

With reference to FIGS. 2-6, although the cascade classifier application 212 and the cascade classifier training application 215 are described as being embodied in software or code executed by general purpose hardware above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of the cascade classifier application 212 and the cascade classifier training application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203 in a computer system 200 or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the cascade classifier application 212 and the cascade classifier training application 215 comprises software or code, it can be embodied in any computer-readable medium for use by or in connection with an instruction execution system such as, for example, a processor 203 in a computer system 200 or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the cascade classifier application 212 and the cascade classifier training application 215 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Therefore, the following is claimed:

1. A system for determining detection certainty in a cascade classifier, the system comprising:
  at least one computer system; and
  a cascade classifier application executable in the at least one computer system, the cascade classifier application comprising:
    a first sequence of one or more detection stages that determines whether an image is associated with a rare object, each detection stage under normal operation rejects the image when the image is determined to be unassociated with the rare object and propagates the image to a next detection stage when the image is unrejected;
    a second sequence of two or more detection stages that determines whether the image is associated with the rare object responsive to the image being unrejected in a final detection stage of the first sequence, each detection stage under post-processing operation propagates the image to a next detection stage and records a rejection when the image is determined to be unassociated with the rare object, wherein each detection stage is configurable under normal or post-processing operation; and
    logic that determines a probability value that the image is associated with the rare object based at least in part on stage responses and stage decisions associated with the second sequence.

2. The system of claim 1, wherein the cascade classifier application further comprises logic that rejects the image based at least in part on the number of rejections recorded by the second sequence and a threshold, wherein the probability value is determined to be zero when the image has been rejected.

3. The system of claim 1, wherein the logic that determines further comprises logic that determines a probability value that the image is associated with the rare object based at least in part on at least one empirical distribution associated with a plurality of images unrejected at the final detection stage of the first sequence and known either to be associated or unassociated with the rare object.

4. The system of claim 3, wherein the cascade classifier application further comprises logic that generates the at least one empirical distribution to model a sum of detection stage responses from the second sequence for the images and the number of rejections recorded by the second sequence for the images.

5. The system of claim 1, further comprising a cascade classifier training application executable in the at least one computer system, the cascade classifier training application comprising:
  logic that divides a combined sequence of detection stages of the cascade classifier into the first sequence and the second sequence; and
  logic that configures each detection stage of the second sequence for post-processing operation.

6. The system of claim 5, wherein the cascade classifier training application further comprises:
  logic that determines whether each one of a set of training images is rejected by each one of the combined sequence of detection stages, the set of training images comprising a set of images known to be associated with the rare object and a set of images known to be unassociated with the rare object; and
  logic that determines a truncation detection stage of the combined sequence, a number of images unrejected at the truncation detection stage from the set of images known to be unassociated with the rare object being substantially equal to the cardinality of the set of images known to be associated with the rare object;
  wherein the logic that divides the combined sequence into the first and second sequences divides the combined sequence such that the final detection stage of the first sequence comprises the truncation detection stage.

7. The system of claim 1, wherein each detection stage in the second sequence generates from a statistical model a probability value that the image is associated with the rare object.

8. The system of claim 1, wherein each detection stage in the second sequence records a detection stage response associated with the image.

9. The system of claim 1, further comprising a cascade classifier training application comprising logic that trains each of the detection stages in the first and second sequences using a set of training images, the set of training images comprising a set of images known to be associated with the rare object and a set of images known to be unassociated with the rare object.

10. The system of claim 1, wherein the image comprises a portion of a larger image.

11. The system of claim 1, wherein the rare object comprises a face.

12. A method for determining detection certainty in a cascade classifier in at least one computer system, the method comprising the steps of:
  determining whether an image is associated with a rare object in a first sequence of one or more detection stages, each detection stage in the first sequence rejecting the image when the image is determined by the detection stage to be unassociated with the rare object, and propagating the image to a next detection stage in the first sequence when the image is unrejected;
  configuring a second sequence of two or more detection stages for post-processing operation, the detection stages of the second sequence configurable for normal or post-processing operation;
  responsive to the image being unrejected in a final detection stage of the first sequence, determining whether the image is associated with the rare object in the second sequence, each detection stage in the second sequence propagating the image to a next detection stage in the second sequence, and recording a rejection when the image is determined by the detection stage to be unassociated with the rare object; and
  determining a probability value that the image is associated with the rare object based at least in part on stage responses and stage decisions associated with the second sequence.

13. The method of claim 12, further comprising the step of rejecting the image based at least in part on the number of rejections recorded by the second sequence and a threshold, wherein the probability value is determined to be zero when the image has been rejected.

14. The method of claim 12, wherein the step of determining a probability value further comprises the step of determining a probability value that the image is associated with the rare object based at least in part on at least one empirical distribution associated with a plurality of images unrejected at the final detection stage of the first sequence and known either to be associated or unassociated with the rare object.

15. The method of claim 12, further comprising the steps of:
  determining whether each one of a set of training images is rejected by each one of a combined sequence of detection stages of the cascade classifier, the set of training images comprising a set of images known to be associated with the rare object and a set of images known to be unassociated with the rare object; and
  determining a truncation detection stage of the combined sequence, a number of images unrejected at the truncation detection stage from the set of images known to be unassociated with the rare object being substantially equal to the cardinality of the set of images known to be associated with the rare object;
  wherein the combined sequence is divided into the first and second sequences such that the final detection stage of the first sequence comprises the truncation detection stage.

* * * * *